Feb. 15, 1927.

J. E. FOSTER 1,617,585

HOIST FOR TRUCKS

Filed Sept. 12 1925  2 Sheets-Sheet 1

INVENTOR.
JAY E. FOSTER.
BY HIS ATTORNEYS

Feb. 15, 1927. 1,617,585
J. E. FOSTER
HOIST FOR TRUCKS
Filed Sept. 12, 1925 2 Sheets-Sheet 2
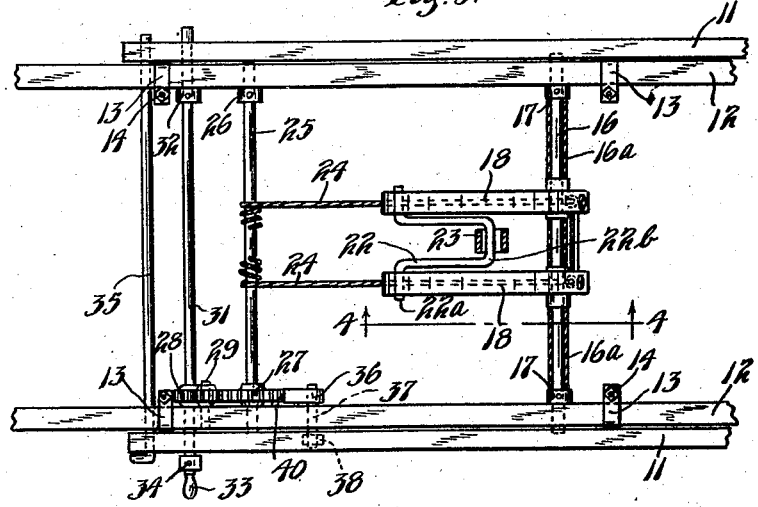
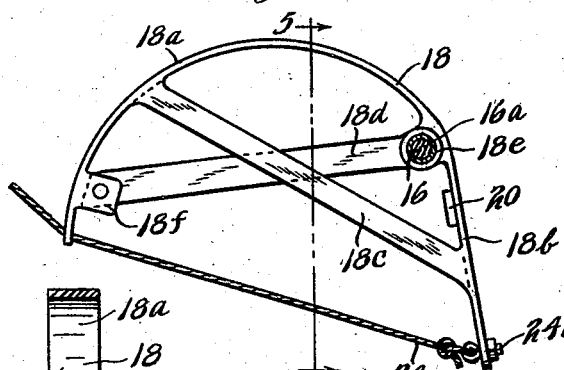
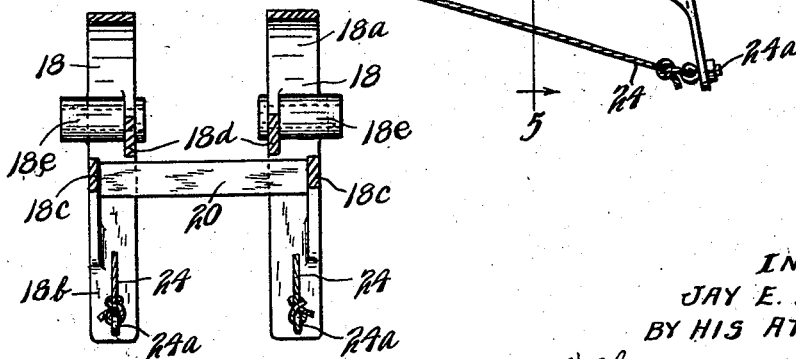
INVENTOR.
JAY E. FOSTER.
BY HIS ATTORNEYS.

Patented Feb. 15, 1927.

1,617,585

UNITED STATES PATENT OFFICE.

JAY E. FOSTER, OF MINNEAPOLIS, MINNESOTA.

HOIST FOR TRUCKS.

Application filed September 12, 1925. Serial No. 55,953.

This invention relates to a hoist for a truck or other vehicle. As is well known, trucks are now being used in large numbers for hauling various articles and it is desirable to have a truck comprising a body which may be elevated, together with simple and efficient means for elevating said body to dump the load. It is also desirable in many instances to have a simple and inexpensive way of converting a non-dumping trunk into a dumping truck.

It is an object of this invention to provide a simple and efficient means for elevating and dumping the body of a truck or other vehicle.

It is also an object of this invention to provide a simple and convenient structure or attachment by means of which a truck, or other vehicle having a body, can quickly be converted into a dumping truck or vehicle.

It is still another object of the invention to provide a dumping mechanism for a pivoted body of a truck or vehicle comprising spaced eccentrics adapted to be revolved about a fixed axis and to engage and raise the body of the truck or vehicle, together with means connected close to the ends of said eccentrics and also pivotally connected to said body forming with said eccentrics a toggle adapted to be straightened to additionally raise said body.

These and other objects and advantages of the invention will be fully set forth in the following description made in connection with the accompanying drawings in which like reference characters refer to the same parts throughout the different views, and in which;

Fig. 3 is a horizontal section taken on the line 3—3 of Fig. 1, as indicated by the arrows;

Fig. 4 is a vertical section taken on the line 4—4 of Fig. 3, as indicated by the arrows; and Fig. 5 is a vertical section taken on the line 5—5 of Fig. 4, as indicated by the arrows.

Figure 1:
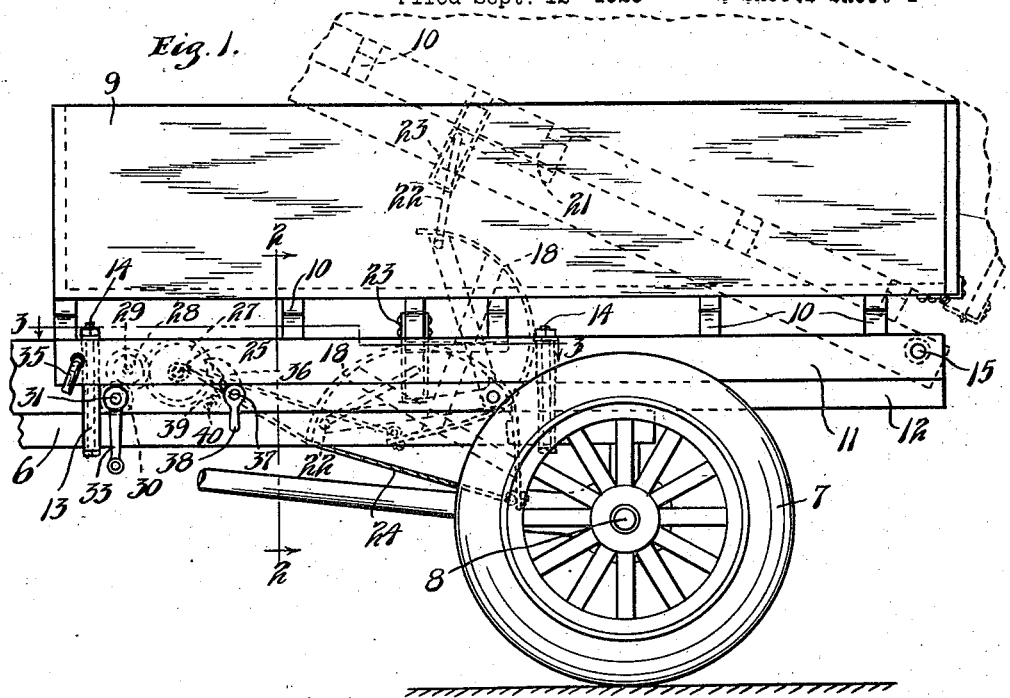
Fig. 1 is a view in side elevation of a portion of the truck showing the invention applied thereto, the parts being indicated in different positions in dotted lines.
Figure 2:
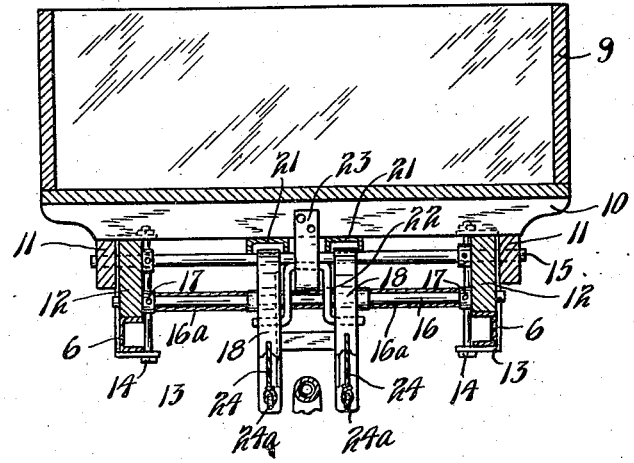
Fig. 2 is a vertical section taken on the line 2—2 of Fig. 1, as indicated by the arrows.

Referring to the drawings, a truck or other vehicle is shown having a frame comprising side longitudinal members 6 suitably supported on rear wheels 7 mounted on an axle 8. The said vehicle is provided with a body 9 illustrated as of rectangular shape in horizontal and vertical cross sections. The body 9 is supported on a plurality of cross bars 10 extending therebeneath, which bars are secured to longitudinally extending stringers or bars 11 at each side of said body. While the present invention is applicable to various types of trucks or vehicles, in the embodiment of the invention illustrated, the same is shown as applied to the well known type of Ford truck. In such a truck of a non-dumping or non-hoisting type, the body 9 would be supported directly on the frame member 6, the members 11 extending at each side thereof.

In accordance with the present invention, an additional pair of longitudinally extending supporting members or stringers 12 are provided adapted to rest upon the frame members 6, and be secured thereto by any suitable means, such as by the yokes or channel clamping members 13, which have one side extending between members 11 and 12 and their ends, which are bent at right angles to said side, extending inwardly at the top and bottom, respectively, of members 12 and 6. Said members 13 have their ends clamped together by a headed and nutted bolt 14 extending vertically at the inner sides of members 12 and 6. The body 9 is pivotally connected to the members 12 by a pivot bar or shaft 15, extending through the members 11 and 12 adjacent their rear ends. A shaft 16 extends between and is journaled in the members 12 some distance forwardly of pivot 15 and is held in place by a collar 17 connected thereto at the inner sides of members 12. Mounted on shaft 16 is a pair of spaced eccentrics 18 having the curved portions 18$^a$ with smooth outer surfaces extending forwardly substantially in the arc of a circle and having downwardly extending straight portions 18$^b$ substantially tangent to the rear ends of portions 18$^a$. Said eccentrics also have bracing members 18$^c$ and 18$^d$ extending thereacross, and are provided with hubs 18$^e$ at the rear ends of said latter members through which shaft 16 extends. Sleeves 16$^a$ extend between eccentrics 18 and collars 17 to position the eccentrics 18 on shaft 16. Said eccentrics may also be connected by a bar 20 extending therebetween and cast with, or welded thereto. Eccentrics 18, and particularly the outer surface of portions 18ᵃ thereof are adapted to engage with plates 21 secured to the bottom of the body member 9 or, specifically, to the bottom of the cross members 10, which plates may be of any desired shape, such as the channel members illustrated. Eccentrics 18 also have lugs 18ᶠ close to their forward or free ends in which are journaled the outwardly extending portions 22ᵃ of the U-shaped yoke member 22, the bight portion 22ᵇ of which is disposed between the sides of a U-shaped bar or yoke 23 connected at its upper end to each side of one of the cross pieces 10. Secured to the lower ends of the portions 18ᵇ of the eccentrics 18 are flexible members of any suitable type, such as the cables 24 shown as connected to nutted eye-bolts 24ᵃ passing through portions 18ᵇ. The portions 18ᵃ of the eccentrics 18 have slots or notches at their free ends adapted to engage cable 24 when the eccentrics 18 are in their lowermost position. The cables 24 extend to and have their ends connected to a windlass shaft 25 also extending between and journaled in the members 12, being held in place at one end by a collar 26 pinned thereto and engaging one member 12, and at its other end by the gear 27 secured thereto and engaging the other member 12. The gear 27 meshes with a gear 28 mounted on a stub shaft 29 journaled in one member 12 and gear 28 in turn meshes with a pinion 30 secured to a shaft 31 also extending between and journaled in the members 12 below members 11, said shaft being held in place at one end by the pinion 30 and at its other end by a collar 32 pinned thereto, which collar and pinion, respectively engage the members 12. The shaft 31 projects at each end beyond the members 11 and is adapted to receive a crank handle 33. The crank handle may be made detachable or may be secured in place by a pin 34. Forward of shaft 31 a bar 35 extends through members 12 and through the members 11 having one end bent at right angles to form a handle by which it may be removed. The rod or bar 35 may be provided with any suitable means (not shown) for holding it from longitudinal movement. A pawl 36 is secured to a stub shaft 37 at the inner side of one of the members 12 in which said shaft 37 is journaled, said shaft having a handle 38 secured thereto at the outer side of said member 12, the pawl 36 being adapted to engage the teeth of gear 27 and being urged into engagement with said teeth by a small tensile spring 39 secured thereto at one end, and at its other end, to a pin 40 projecting inwardly from member 12.

In operation, the body 9 normally occupies the position shown in full lines in Fig. 1 and at this time the cables 24 are in the position shown in full lines in Fig. 1, and eccentrics 18 are in the lower position shown in Fig. 1. When it is desired to dump the body 9 the rod 35 will be removed and crank 33 will then be turned. This will rotate pinion 30 and through the gear 28 will rotate the gear 27 and shaft 25. Upon rotation of shaft 25 the cable 24 will be wound thereon, as indicated in Fig. 3 and eccentrics 18 on shaft 16 will be rotated in a clockwise direction. As eccentrics 18 are rotated, the outer surface of portions 18ᵃ slide on plates 21 and said plates, with the body 9, will be elevated. It will be seen that normally, the yoke 22 will be in the lower position shown in Fig. 1. As eccentrics 18 are raised, the portion 22ᵇ of said yoke will gradually move upward between the sides of yoke 23. As the eccentrics approach their upper limit of movement the portion 22ᵇ engages the bottom of cross piece 10 carrying member 23. The eccentrics 18 and member 22 now act as a toggle and further movement of eccentrics 18 and shaft 16 straightens this toggle so that the body 9 is additionally raised by the member 22, the plates 21 moving out of engagement with eccentrics 18. A greater range of movement is thus obtained than could be obtained with the eccentrics alone. Reverse movement of gear 27 and lowering of the body is prevented by the pawl 36. When it is desired again to lower body 9 pawl 36 can be disengaged by swinging handle 38 and the body 9 gradually lowered by permitting crank 33 slowly to revolve. When the body is again in horizontal or normal position, rod 35 can be again inserted in place to lock the front end of said body in its normal position.

From the above description it is seen that the applicant has provided a very simple and efficient hoist or elevating mechanism for a truck or vehicle body and has also provided a very simple attachment comprising members 12 and parts carried thereby, which can be quickly and easily installed on the truck or vehicle. It is only necessary to remove the body 9 with its members 10 and 11 and to secure the members 12 to the frame members 6. Members 21 and 23 can then be secured to the members 10, the pivot member 15 provided and the truck is then converted into a dumping truck. The device comprises comparatively few parts which are easily and inexpensively made. The device has been amply demonstated in actual practice and found to be very successful and efficient.

It will, of course, be understood that various changes may be made in the form, details, arrangement and proportions of the parts without departing from the scope of the applicant's invention, which, generally stated, consists in a device capable of carrying out the objects above set forth, in the novel parts and combinations of parts disclosed and defined in the appended claims,

What is claimed is:

1. The combination with a vehicle body adapted to be raised, and a frame, of a shaft revolubly mounted in said frame, spaced eccentrics mounted on said shaft adapted to engage and raise said body on rotation of said shaft, means for rotating said shaft and eccentrics for initially raising said body, and a U-shaped yoke disposed between said eccentrics and pivoted at one end to said eccentrics close to their free ends and pivotally and slidably connected at its other end to said vehicle body, whereby it will not function in the initial movement of said eccentrics but will form in effect with said eccentrics a toggle in the later movement of said eccentrics, whereby said body will be additionally lifted by said yoke and toggle.

2. A hoist attachment for a vehicle comprising spaced longitudinal members adapted to be supported on the vehicle frame, means for connecting said members to said frame, a pivot member traversing said members adapted to form a pivot for the vehicle body, a shaft supported in and traversing said longitudinal members, a pair of eccentric bars carried by said longitudinal members for initially raising the body, and a member pivotally connected at one end to said eccentric bars movable between the same and slidably and pivotally connected at its other end to said body and arranged to form with said eccentric bars a toggle adapted to be straightened to additionally raise said body.

3. The combination with a wagon body adapted to be raised and a frame, of a shaft mounted in said frame, spaced eccentrics on said shaft adapted to engage and raise said body when rotated, means for rotating said eccentrics, a yoke having laterally extending pivots at its open end journaled in said eccentrics, and said yoke being connected to said body at its closed end with a slidable and pivotal connection.

4. The combination with a vehicle body adapted to be raised and a frame, of a shaft mounted in said frame, means for rotating said shaft, spaced eccentrics on said shaft and adapted to engage and raise said body when rotated, means for rotating said eccentrics, a narrow yoke depending from the bottom of said vehicle body, a U-shaped yoke disposed between said eccentrics having the ends of its legs pivoted close to the ends of said eccentrics and having its bight portion disposed between the sides of said narrow yoke so as to have pivotal and slidable movement therein and adapted to engage the bottom of said body, said U-shaped yoke forming in effect with said eccentrics a toggle whereby said body will be additionally lifted by said yoke and toggle.

In testimony whereof I affix my signature.

JAY E. FOSTER.